United States Patent [19]

Carleton et al.

[11] 4,126,742
[45] Nov. 21, 1978

[54] HIGH-MODULUS POLYISOCYANURATE ELASTOMERS

[75] Inventors: Peter S. Carleton, Branford, Conn.; James H. Ewen, Jr., Seabrook, Tex.; Harold E. Reymore, Jr., Wallingford, Conn.

[73] Assignee: The Upjohn Company, Kalamazoo, Mich.

[21] Appl. No.: 905,653

[22] Filed: May 15, 1978

[51] Int. Cl.$^2$ .................. C08G 18/22; C08G 18/76; C08G 18/32
[52] U.S. Cl. ............................. 528/57; 428/423; 528/44; 528/54; 528/67; 528/905; 528/906
[58] Field of Search ......................... 260/77.5 NC
[56] References Cited

U.S. PATENT DOCUMENTS

| | | |
|---|---|---|
| 3,620,987 | 11/1971 | McLaughlin et al. ........ 260/77.5 NC |
| 3,745,133 | 7/1973 | Communale et al. ........ 260/77.5 NC |
| 3,849,349 | 11/1974 | Frisch et al. ................ 260/77.5 NC |
| 3,986,991 | 10/1976 | Kolakowski et al. ....... 260/77.5 NC |

*Primary Examiner*—H.S. Cockeram
*Attorney, Agent, or Firm*—James S. Rose; Denis A. Firth

[57] ABSTRACT

Novel solid polyisocyanurate polymers are disclosed which comprises the reaction product of an organic polyisocyanate, a trimerization catalyst and a polyol combination comprising from about 0.025 to about 0.15 equivalent and about 0.05 to about 0.25 equivalent, per equivalent of polyisocyanate, respectively of an ethylene oxide capped polypropyleneoxy glycol having an equivalent weight of from about 750 to about 1500 and either 1,4-butanediol or diethylene glycol.

Although containing a higher proportion of polyurethane linkages than those polyisocyanurates containing the polypropyleneoxy glycol alone, the polymers of the invention are characterized by superior high temperature resistance and are particularly useful in the preparation of high modulus molded parts using reaction injection molding (RIM) techniques.

12 Claims, No Drawings

HIGH-MODULUS POLYISOCYANURATE ELASTOMERS

BACKGROUND OF THE INVENTION

1. Field of the Invention

This invention relates to novel polymeric materials and is more particularly concerned with polymeric materials in which the major recurring polymer unit is an isocyanurate moiety.

2. Description of the Prior Art

The trimerization of organic polyisocyanates to form polyisocyanurates useful in a number of applications such as binding agents, laminating or impregnating resins, adhesives, shaped articles, and the like, has been well known for some time to those skilled in the art; see for example U.S. Pat. Nos. 2,993,870, 3,206,352, 3,580,868, and 3,711,444.

Solid polyisocyanurate polymers have historically been affected by the problem of brittleness due to the high crosslink density of the trimerization network. The addition of minor amounts of polyols has been employed in the art to decrease polymer brittleness by virtue of the minor formation of polyurethane linkages. A particularly effective solution to the brittleness problem, as reflected in the improved impact strengths, for self-skinned polyisocyanurate foamed articles is disclosed in U.S. Pat. No. 3,836,424 wherein particular choices of polyol components give rise to much greater impact strengths in comparison to other polyols which do not provide the same improvements.

However, a drawback to the addition of polyols to the reaction mixture for preparation of solid polyisocyanurates is the resultant lowering which the addition causes in the high temperature resistant properties of said polyisocyanurates. Obviously, good high temperature resistance would be one of the reasons for which the polyisocyanurate would have been originally chosen for a particular application. Any lowering of this property would therefore be self-defeating.

Surprisingly, it has now been discovered that the use of a polyol combination comprising a member from a narrow class of high molecular weight polyols with either 1,4-butanediol or diethylene glycol gives rise to solid polyisocyanurate polymers characterized by the expected good impact strength but having unexpectedly superior heat resistance compared to the corresponding polyisocyanurate polymers prepared using only the single polyol component of the high molecular weight class. The increased heat resistance occurs even though the latter polymers contain a lower proportion of polyurethane linkages when compared to the former.

The present polyol combinations, used in conjunction with organic polyisocyanates, provide polyisocyanurates having unexpectedly higher heat resistance, particularly as measured by heat distortion or heat deflection temperatures under load measured in accordance with ASTM test procedure D-648, over what has been taught in the prior art.

SUMMARY OF THE INVENTION

This invention comprises a solid polymer in which the major recurring polymer unit is isocyanurate which polymer comprises the reaction product obtained by bringing together an organic polyisocyanate, a trimerization catalyst, and a minor amount of a polyol wherein the improvement consists of employing as the polyol a combination comprising:

(1) from about 0.025 equivalent to about 0.15 equivalent, per equivalent of polyisocyanate, of an ethylene oxide capped polypropyleneoxy glycol having an equivalent weight from about 750 to about 1500; and (2) from about 0.05 equivalent to about 0.25 equivalent, per equivalent of polyisocyanate, of a diol selected from the group consisting of 1,4-butanediol and diethylene glycol.

The term "solid" refers to an essentially non-cellular polymer.

The total polyol equivalents employed, per equivalent of polyisocyanate, including both the polypropyleneoxy glycol and either the 1,4-butanediol or diethylene glycol, is from about 0.075 equivalent to about 0.40 equivalent, preferably from about 0.15 to about 0.30.

The polyisocyanurate polymers prepared in accordance with the present invention can be used as binding agents, laminating or impregnating resins, and adhesives, and for the preparation of shaped articles such as electrical connectors, components, and the like, including electrical potting and encapsulating materials, and particularly any of the above applications calling for high temperature resistant properties.

The polymers in accordance with the present invention find particular utility in the manufacture of molded high modulus automotive parts such as hoods, doors, trunk lids, fenders, and the like, when prepared by reaction injection molding (RIM) techniques; see Liquid Reaction Molded Polyurethanes by F. E. Critchfield, National Technical Conference of the Society of Plastics Engineers, page 64, Nov. 12, 1974 for a detailed discussion of RIM processing techniques.

Heretofore, only polyurethane polymers have been utilized in the preparation of high modulus molded automotive parts using RIM technology and the heat distortion or deflection temperatures under load (HDT) of such parts as determined by the ASTM method noted above for a 0.01 inch deflection under 264 psi are approximately 50° C.

The present invention is believed to mark the first polyisocyanurate type polymers that can be utilized in RIM technology to produce high modulus molded parts which are characterized by HDT values which far exceed the 50° C. level of polyurethanes being at least above 100° C.

DETAILED DESCRIPTION OF THE INVENTION

The improved solid polyisocyanurate polymers of the present invention are obtained by an improvement in the known process for trimerizing organic polyisocyanates in the presence of minor amounts of polyol constituents; see U.S. Pat. No. 3,711,444 whose general disclosure relating thereto is hereby incorporated by reference herein.

The novelty in the present invention resides in the combination of polyol constituents employed, particularly in the critical choice of a high molecular weight glycol combined with the low molecular weight 1,4-butanediol or diethylene glycol, both constituents falling within specific limitations of proportions in relation to the polyisocyanate.

The high molecular weight glycol is an ethylene oxide capped polypropyleneoxy glycol having a hydroxyl equivalent weight of from about 750 to about 1500, preferably from about 800 to about 1000. The ethyleneoxy content of the glycol is advantageously from about 25 weight percent to about 60 weight percent of the overall weight of the glycol, and preferably 40 to 55 weight percent.

This class of ethyleneoxy-polypropyleneoxy glycols are well known to those skilled in the art being obtained from the poly addition of propylene oxide to water, ethylene glycol, diethylene glycol or the like, followed by the poly addition of ethylene oxide. The choice of starting hydroxyl compound is not critical so long as the resultant hydroxyl equivalent weight after propoxylation and ethoxylation falls within the ranges set forth above.

The polypropyleneoxy glycol is advantageously employed in the reaction mixture in a range of about 0.025 equivalent to about 0.15 equivalent per equivalent of polyisocyanate, and preferably from about 0.05 equivalent to about 0.10 equivalent.

The other constituent of the polyol combination, namely, 1,4-butanediol or diethylene glycol, is advantageously employed in the reaction mixture in a range of about 0.05 equivalent to about 0.25 equivalent per equivalent of polyisocyanate, and preferably from about 0.10 equivalent to about 0.20 equivalent.

Any organic polyisocyanate which can be readily trimerized with conventional catalysts (as described below) may be trimerized to the novel polyisocyanurate polymeric materials in accordance with the present invention. Typical of the organic polyisocyanates which can be employed in the present invention are those set forth in U.S. Pat. No. 3,711,444 column 3 lines 7 to 45 whose disclosure thereof is incorporated by reference herein.

A preferred class of organic polyisocyanates is comprised of a polymethylene polyphenylisocyanate mixture comprising from about 30 percent to about 80 percent by weight of methylenebis(phenylisocyanate) and the remainder of said mixture being polymethylene polyphenylisocyanates of functionality higher than 2; methylenebis(phenylisocyanate), both the 4,4'-isomer and mixtures of 4,4'- with 2,4'- in various proportions; the various types of liquified 4,4'-methylenebis(phenylisocyanate) such as those disclosed in U.S. Pat. Nos. 3,384,653, 3,394,164, and 3,394,165 wherein storage stable liquid methylenebis(phenylisocyanates) are obtained by reacting said methylenebis(phenylisocyanates), including the 4,4'-isomer, the 2,4'-isomer, and mixtures of said 4,4'- and 2,4'-isomers in varying proportions with minor amounts of either a trihydrocarbyl phosphate, or dipropylene glycol, or N,N-di(2-hydroxypropyl)aniline respectively; and a liquid isocyanate prepolymer composition comprising the product obtained by bringing together a polymethylene polyphenylisocyanate containing from about 65 to about 85 percent by weight of methylenebis(phenylisocyanate) the remainder of said polymethylene polyphenylisocyanates having a functionality greater than 2 and from about 0.0185 to about 0.15 equivalent, per equivalent of said polyphenylisocyanate of a polyoxyethyleneglycol having an average molecular weight from about 200 to about 600 in accordance with U.S. Pat. No. 4,055,548.

The trimerization catalyst employed in accordance with the present invention can be any catalyst known in the art which will catalyze the trimerization of the organic polyisocyanate to polyisocyanurate. Further, a combination of urethane forming catalyst and trimerization catalyst can be employed if desired.

Typical trimerization catalysts are those disclosed in the Journal of Cellular Plastics, November/December 1975, p. 329; U.S. Pat. Nos. 3,745,133, 3,896,052, 3,899,443, 3,903,018, and 3,954,684, and mixtures of any of the catalysts disclosed therein the disclosures of these references being hereby incorporated by reference herein.

A preferred group of trimerizing agents is comprised of the following classes including mixtures of any of these in any proportions found to be efficacious.

(1) Tertiary amine compounds which include N,N-dialkylpiperazines such as N,N-dimethylpiperazine, N,N-diethylpiperazine and the like; trialkylamines such as trimethylamine, triethylamine, tributylamine and the like; 1,4-diazabicyclo[2.2.2]octane, which is more frequently referred to as triethylene diamine, and the lower-alkyl derivatives thereof such as 2-methyltriethylene diamine, 2,3-dimethyl-triethylene diamine, 2,5-diethyltriethylene diamine and 2,6-diisopropyltriethylene diamine; N,N',N"-tris(dialkylaminoalkylhexahydrotriazines such as N,N',N"-tris(dimethylaminomethyl)hexahydrotriazine, N,N',N"-tris(dimethylaminoethyl)hexahydrotriazine, N,N',N"-tris(dimethylaminopropyl)-hexahydrotriazine, N,N',N"-tris(diethylaminoethyl)-hexahydrotriazine, N,N',N"-tris(diethylaminopropyl)-hexahydrotriazine, and the like; mono-, di-, and tri(-dialkylaminoalkyl) monohydric phenols or thiophenols such as 2-(dimethylaminomethyl)phenol, 2-(dimethylaminobutyl)phenol, 2-(diethylaminoethyl)phenol, 2-(diethylaminobutyl)phenol, 2-(dimethylaminomethyl)thiophenol, 2-(diethylaminoethyl)thiophenol, 2,4-bis(dimethylaminomethyl)phenol, 2,4-bis(dimethylaminoethyl)phenol, 2,4-bis(diethylaminobutyl)-phenol, 2,4-bis(dipropylaminoethyl)phenol, 2,4-bis(-dimethylaminoethyl)thiophenol, 2,4-bis(diethylaminopropyl)thiophenol, 2,4-bis(dipropylaminoethyl)thiophenol, 2,4,6-tris(dimethylaminomethyl)phenol, 2,4,6-tris(dimethylaminoethyl)phenol, 2,4,6-tris(diethylaminoethyl)phenol, 2,4,6-tris(dimethylaminobutyl)-phenol, 2,4,6-tris(dipropylaminomethyl)phenol, 2,4,6-tris(diethylaminoethyl)thiophenol, 2,4,6-tris(dimethylaminoethyl)thiophenol and the like; N,N,N',N'-tetraalkylalkylenediamines such as N,N,N',N'-tetramethyl-1,3-propanediamine, N,N,N',N'-tetramethyl-1,3-butanediamine, N,N,N',N'-tetramethylethylenediamine, N,N,N',N'-tetraethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N',N'-tetraalkylguanidines such as N,N,N',N'-tetramethylguanidine, N,N,N',N'-tetraethylguanidine and the like. The preferred tertiary amine catalysts for use in the process of the invention are the triethylene diamines, the N,N',N"-tris(dialkylaminoalkyl)hexahydrotriazines, the mono(-dialkylaminoalkyl)phenols, and the 2,4,6-tris(dialkylaminoalkyl)phenols.

(2) Alkali metal salts of lower alkanoic acids such as the sodium, potassium, or lithium salts of formic acid, acetic acid, propionic acid, butyric acid, isobutyric acid, valeric acid, caproic acid, heptanoic acid, caprylic acid, 2-methylhexanoic acid, 2-ethylhexanoic acid, and the like. A preferred member of this group is potassium 2-ethylhexanoate.

(3) Combinations of an alkali metal salt of an N-substituted amide with an alkali metal salt of an N-(2-hydroxyphenyl)methyl glycine; and optionally a tertiary amine trimerization catalyst in accordance with the teaching of U.S. Pat. No. 3,896,052 (cited supra).

(4) Combinations of a tertiary amine trimerization catalyst with an alkali metal salt of an N-substituted amide and a dibutyl tin di(alkanoate) in accordance with the teaching of U.S. Pat. No. 3,899,443 (cited supra).

(5) Combinations of monomeric epoxides with a tertiary amine trimerization catalyst containing a dimethylamino group and an alkali metal salt of an N-(2-hydroxyphenyl)methyl glycine in accordance with the teaching of U.S. Pat. No. 3,903,018 (cited supra).

(6) Combinations of a tertiary amine trimerization catalyst and a quaternary ammonium salt of an alkanoic acid in accordance with the teaching of U.S. Pat. No. 3,954,684 (cited supra).

A particularly preferred combination of catlysts for use in the present invention is the combination of any one of the tertiary amine compounds (1) set forth above with either the alkali metal salts of lower alkanoic acids (2) set forth above or with the N-(2-hydroxyphenyl)-methyl glycine compounds of the type disclosed in (3) and (5) cited supra.

Particularly preferred species of these preferred combinations include the combination of N,N',N"-tris(dimethylaminopropyl)hexahydrotriazine with either potassium 2-ethylhexanoate or with sodium N-(2-hydroxy-5-nonylphenyl)methyl-N-methylglycinate.

The total catalyst concentration which includes either a single catalyst or combinations of any of the types set forth above employed in the present formulations is not critical being easily determined or optimized by one skilled in the art. Generally speaking the total catalyst concentration in parts by weight per equivalent of polyisocyanate can fall within the range of from about 0.3 parts to about 5.0 parts, and preferably from about 0.4 parts to about 3.0 parts.

When a mixture of catalysts are employed in combination the proportions of the various components in the combinations are not critical and can be easily determined or optimized by one skilled in the art for the particular combination chosen for any given polymerization reaction. If combinations are chosen from the prior art cited supra then the proportions can be conveniently chosen from said art. Alternatively, if combinations of two catalysts are employed which combinations have not specifically been disclosed previously then such proportions can be easily determined by one skilled in the art. Generally speaking, the proportions by weight of one component relative to the second can vary from about 10 to 1 to about 1 to 10.

The process of the invention is carried out simply by bringing together the organic polyisocyanate, polyol combination, and catalyst in any desired manner which will provide efficient mixing of the reactants and which will also allow quick transfer of the resultant mixed resin mass to a receiving means before it begins to harden. The method of introducing the polyol combination into the reaction zone is not critical. The ethyleneoxy-propyleneoxy glycol and diethylene glycol or 1,4-butanediol can be added as a mixture or as single components into the polyisocyanate. Any suitable reaction vessel having means for stirring may be employed such as a resin kettle, or reactor vessel. However, the ultimate choice of the means for bringing the reactants together will be determined largely by the quantities of reactants and the specific applications involved. When only small preparations are involved then small resin kettles, or tubs or beakers are suitable because the reactants can be quickly transferred or cast into a mold or onto a flat surface where the polyisocyanurate can solidify and cure out.

Generally speaking, the polyisocyanurates in accordance with the present invention are prepared by pumping the reactants under pressure to a mixing chamber and then the liquid resin is poured, ejected, pumped, or otherwise discharged into a mold or some suitable receiving means where the polymerization occurs. It is in the field of RIM technology that the present invention finds particular utility and unexpected properties; see reference cited supra for teaching related to carrying out polymerizations using high pressure mixing heads and ejecting the reactants into closed molds.

The reactants can be all at ambient room temperature (about 20° C.) when brought together, or, alternatively, one or all of the components can be at an elevated temperature up to about 150° C. if a faster reaction is desired.

After the resin has been molded the curing phase will depend on the particular reactants, catalyst levels, reactant temperature, and the like. Generally speaking, the polyisocyanurate will be cured for at least 30–120 seconds and at a temperature of at least 30° C. Optionally, the in-mold cure can be followed by a postcure period typically at temperatures of about 125° C. for about 1 hr. or by standing at ambient temperatures for 24–48 hours.

Other optional additives can be employed in the reaction such as dispersing agents, flame retardants, colorants, antioxidants, and the like.

Particularly useful additives are those which provide filled polymers in accordance with the present invention. Such fillers include, but are not limited to, powdered, granular, fibrous, or flaked inorganic materials such as clay, talc, glass, mica, titanium dioxide, diatomaceous earth, glass microbubbles, and the like, and organic materials such as rubber, polyamides, polyamideimides, polyimides, polybenzimidazoles, carbon, including particles, granules and fibers, and the like, or combinations of any of the above.

The fillers are advantageously employed in the range of from about 5 weight percent to about 60 weight percent of the reaction mixture.

As was noted hereinbefore, the polyisocyanurates of the present invention can be employed in RIM technology to produce high modulus molded parts characterized by a resistance to heat which is superior to the prior art polyurethanes by a factor of about 2.

The surprising and unexpected discovery in the present invention lies particularly in the finding that the polyisocyanurates obtained, which contain both a high molecular weight polyethyleneoxy-polypropyleneoxy glycol and either 1,4-butanediol or diethylene glycol present in particular proportions, are characterized by superior high temperature properties including polymer softening point, heat sag, but more particularly, heat distortion temperature when compared to the same polyisocyanurate polymers except for the absence of the 1,4-butanediol or diethylene glycol component. The former polymers are characterized by the superior high temperature properties notwithstanding the fact that they contain a greater proportion of polyurethane linkages than the latter polymers and the presence of polyurethane linkages are generally recognized for depressing the high temperature properties of polyisocyanurates.

In a further unexpected discovery in accordance with the present invention the amount and choice of the high molecular weight polyol constituent and the low molecular weight diol were found to be very critical. Comparison tests showed that when a number of high molecular weight polyols or combinations outside the scope of the invention were employed (see Example 1 Plaques D and E, and Examples 2, 3, and 4) a lowering in HDT values of the resultant plaques could be observed.

The following examples describe the manner and process of making and using the invention and set forth the best mode contemplated by the inventors of carrying out the invention but are not to be construed as limiting.

EXAMPLE 1

Polyisocyanurate polymers in accordance with the present invention (Plaques A and B) were prepared by mixing the ingredients in parts by weight set forth in Table I below.

The polyisocyanate was a polymethylene polyphenylisocyanate mixture comprising about 65 percent by weight of methylenebis(phenylisocyanate) and about 35 percent of polymethylene polyphenylisocyanates of functionality higher than 2 and having an isocyanate equivalent weight of about 135. The A component consisting of polyisocyanate in the parts by weight set forth in Table I was weighed into an 800 ml. polyethylene beaker. Component B which consisted of the ethylene oxide capped polypropyleneoxy diol and either the 1,4-butanediol for Plaque A or diethylene glycol for Plaque B in the parts by weight set forth in Table I was thoroughly blended into the polyisocyanate by stirring the components manually with a stirring rod for 10 seconds at room temperature (about 22° C.). Immediately following this, the catalyst component C was added by syringe and the contents of the beaker thoroughly stirred for a 10 second period.

The reactants were immediately poured into an electrically heated chromium plated open steel mold having a mold volume of 8 × 8 × ⅛ inches with the mold maintained at a temperature of 200° F. Residence time in the heated mold was about 1 minute. After the translucent polyisocyanurate plaques were demolded they were cured by allowing them to stand for at least 24 hours before they were subjected to the various tests set forth in Table I.

Using the same procedure and ingredients as employed in Plaque A except for the ingredient changes set forth in Table I there were prepared Plaques C through E not in accordance with the present invention. It should be noted from Table I that for all Plaques A through E, the isocyanate concentrations and high molecular weight polyol concentrations were common at 1.0 and 0.05 equivalents respectively. Where employed, the ethylene glycol, 1,4-butanediol, diethylene glycol or dipropylene glycol were employed at the 0.1 equivalent level.

A comparison of the heat distortion temperatures of Plaques A through E shows the higher heat distortion temperatures of A and B over C, D, and E. Plaques A and B, although each containing a total of 0.15 equivalent of polyol content arising from the 0.05 equivalent of polypropyleneoxy diol and 0.1 equivalent of 1,4-butanediol and diethylene glycol respectively are characterized by higher heat distortion temperature than Plaque C which contains a total of only 0.05 equivalent of polyol arising from the polypropyleneoxy diol alone. Plaques D and E each contain a total of 0.15 equivalent of polyol arising from the polypropyleneoxy diol with the dipropylene glycol and ethylene glycol respectively, and expectedly both are characterized by lower heat distortion temperatures than C. Although Plaques D and E contain the same level of total polyol as A or B they are characterized by lower heat distortion temperatures showing the difference between the effect of 1,4-butanediol and diethylene glycol on the one hand versus dipropylene glycol and ethylene glycol on the other.

TABLE I

| Plaque | A | B | C | D | E |
|---|---|---|---|---|---|
| Ingredients (in pts. by wt.): | | | | | |
| Component A: Polyisocyanate | 135 (1.0 eq.) | 135 | 135 | 135 | 135 |
| Component B: Ethylene oxide capped polypropyleneoxy diol[1] (1000 E.W.) | 50 (0.05 eq.) | 50 | 50 | 50 | 50 |
| 1,4-Butanediol | 4.5 (0.1 eq.) | — | — | — | — |
| Diethylene glycol | — | 5.3 (0.1 eq.) | — | — | — |
| Dipropylene glycol | — | — | — | 6.7 (0.1 eq.) | — |
| Ethylene glycol | — | — | — | — | 3.1 (0.1 eq.) |
| Component C: Catalyst[2] | 1.0 | 1.0 | 1.0 | 1.0 | 1.0 |
| Properties: | | | | | |
| Specific gravity | 1.231 | 1.220 | 1.233 | 1.225 | 1.235 |
| Rockwell hardness[3] | 93E | 89E | 97E | 88E | 90E |
| Tensile strength (psi) | 3800 | 5320 | 5570 | 4500 | 3850 |
| Elongation (%) | 2.4 | 3.7 | 3.8 | 2.8 | 2.6 |
| Flexural modulus (psi) | 286,900 | 308,800 | 341,200 | 346,300 | 265,700 |
| Flexural strength (psi) | 8720 | 12050 | — | 12190 | 7810 |
| Falling dart impact (ft.-lb.)[4] | 0.16 | 0.18 | 0.19 | 0.15 | 0.14 |
| Coeff. of thermal[5] expansion × $10^{-5}$ (inches/inch ° C) | 10.0 | 10.1 | 9.3 | 10.1 | 9.7 |
| Softening point, ° C[6] | 222 | 205 | 158 | 205 | 208 |
| Heat distortion temp.[7] | | | | | |

TABLE I-continued

| Plaque | A | B | C | D | E |
|---|---|---|---|---|---|
| °C (under 264 psi at 0.01" deflection) | 196 | 182 | 179 | 177 | 164 |

Footnotes to Table I:
[1]An ethylene oxide capped polypropyleneoxy diol containing 45% by wt. of ethyleneoxy units and having the hydroxyl equiv. wt. value noted above.
[2]Catalyst is a blend comprising in the proportions by weight of about 3.6 parts of N,N',N''-tris(dimethylaminopropyl)hexahydrotriazine and 1 part of a 67 percent by weight solution of potassium 2-ethylhexanoate dissolved in about a 400 molecular weight polypropylene glycol.
[3]Rockwell hardness was determined using the test conducted in accordance with ASTM test D-785.
[4]Falling dart impact was determined using the test conducted in accordance with D-1709 but which was modified for use in testing thin sections or films.
[5]Coefficient of thermal expansion was determined by thermal mechanical analysis using a Perkin Elmer Model TMS-1 TMA instrument.
[6]Softening point was determined using the TMA apparatus set forth in footnote 5 using the standard TMA procedure.
[7]Heat distortion temperature measures the temperature at which a 0.01" deflection of a sample is observed at 264 psi and was measured in accordance with ASTM D-648.

EXAMPLE 2

The following six polyisocyanurate plaques (F through K) not in accordance with the present invention were prepared using the same procedure and reactants set forth in Example I except for the ingredient changes in Component B set forth in Table II below.

The polypropyleneoxy diol was not in accordance with the present invention and the addition of a 0.1 equivalent of any one of the low molecular weight diols set forth in Plaques G through K gave rise to a lowering of the HDT values in accordance with the increase in polyurethane content over the value for Plaque F. No result similar to that observed for Plaque A and B of Example 1 could be found in this series. As the equivalent weight of the diol was increased in going from Plaque G to K the HDT values reflected a generally greater reduction.

A similar general decrease was observed for the polymer softening points except for G. Softening points of polymers occur at a higher temperature along the modulus-temperature curve than do the corresponding HDT values and are not considered as reliable a test for high temperature resistance as the HDT measurement because the sample being tested is under no stress load in the softening test.

EXAMPLE 3

The following three polyisocyanurate plaques (L, M, and N) not in accordance with the present invention were prepared using the same procedure and reactants set forth in Example 1 except for the ingredient changes in Component B set forth in Table III below.

The addition of 0.1 equivalent of ethylene glycol or dipropylene glycol to the polypropyleneoxy diol not of the invention, while resulting in an increase of polymer softening points in Plaques M and N over that of Plaque L at the same time resulted in the lowering of the more important HDT values of M and N with respect to L.

TABLE III

| Plaque | L | M | N |
|---|---|---|---|
| Component B (pts. by wt.): | | | |
| Polypropyleneoxy diol (500 E.W.) | 50 (0.1 eq.) | 50 | 50 |
| Ethylene glycol | — | 3.1 (0.1 eq.) | — |
| Dipropylene glycol | — | — | 6.7 (0.1 eq.) |
| Properties: | | | |
| Softening point, °C | 183 | 206 | 186 |
| Heat distortion temp. °C (under 264 psi at 0.01" deflection) | 179 | 176 | 146 |

TABLE II

| Plaque | F | G | H | I | J | K |
|---|---|---|---|---|---|---|
| Component B (pts. by wt.): | | | | | | |
| Polypropyleneoxy diol (1000 E.W.) | 100 (0.1 eq.) | 100 | 100 | 100 | 100 | 100 |
| Ethylene glycol | — | 3.1 0.1 eq.) | — | — | — | — |
| 1,4-Butanediol | — | — | 4.5 (0.1 eq.) | — | — | — |
| Diethylene glycol | — | — | — | 5.3 (0.1 eq.) | — | — |
| Dipropylene glycol | — | — | — | — | 6.7 (0.1 eq.) | — |
| C-100[1] | — | — | — | — | — | 10.3 (0.1 eq.) |
| Properties: | | | | | | |
| Specific gravity | 1.160 | 1.177 | 1.176 | 1.174 | 1.176 | 1.174 |
| Rockwell hardness | 89L | 54E | 62E | 61E | 35E | 53E |
| Tensile strength (psi) | 3550 | 3010 | 3450 | 3510 | 4280 | 4400 |
| Elongation (%) | 5.6 | 5.8 | 6.8 | 7.0 | 12.7 | 8.7 |
| Flexural modulus | 143,100 | 144,500 | 139,700 | 138,800 | 149,000 | 179,100 |
| Falling dart impact, ft.-lb. | 0.33 | 0.23 | 0.18 | 0.16 | 0.60 | 0.47 |
| Coeff. of thermal expansion $\times 10^{-5}$ (inches/inch/°C) | 13.9 | 14.9 | 14.7 | 14.5 | 14.1 | 14.4 |
| Heat sag (inches/30' at 325° F) | 0.07 | 0.15 | 0.08 | 0.09 | 0.33 | 0.24 |
| Softening point, °C | 174 | 184 | 173 | 171 | 141 | 157 |
| Heat distortion temp. °C (under 264 psi at 0.01" deflection) | 149 | 133 | 136 | 109 | 59 | 61 |

Footnote to Table II:
[1]C-100 is the product of the reaction of aniline with two molar proportions of propylene oxide; hydroxyl eq. wt. = 103.

EXAMPLE 4

The following five polyisocyanurate plaques (O through S) not in accordance with the present invention were prepared using the same procedure and reactants set forth in Example 1 except for the ingredient changes in Component B set forth in Table IV below.

The addition of the 0.1 equivalent of each one of the low molecular weight diols to a polypropyleneoxy triol not in accordance with the present invention provided plaques having higher softening points than that of Plaque O but lower HDT values.

TABLE IV

| Plaque | O | P | Q | R | S |
|---|---|---|---|---|---|
| Component B (pts. by wt.): | | | | | |
| Polypropyleneoxy triol[1] (500 E.W.) | 50 (0.1 eq.) | 50 | 50 | 50 | 50 |
| Ethylene glycol | — | 3.1 (0.1 eq.) | — | — | — |
| 1,4-Butanediol | — | — | 4.5 (0.1 eq.) | — | — |
| Diethylene glycol | — | — | — | 5.3 (0.1 eq.) | — |
| Dipropylene glycol | — | — | — | — | 6.7 (0.1 eq.) |
| Properties: | | | | | |
| Softening point, °C | 166 | 198 | 193 | 188 | 181 |
| Heat distortion temp. °C (264 psi, 0.01" deflection) | 166 | 154 | 159 | 157 | 144 |

Footnote to Table IV:
[1] Polypropyleneoxy triol is a propoxylated hexanetriol having the hydroxyl equiv. wt. value noted above.

We claim:

1. In a solid polymer in which the major recurring polymer unit is isocyanurate which polymer comprises the reaction product obtained by bringing together an organic polyisocyanate, a trimerization catalyst and a minor amount of a polyol the improvement which comprises employing as the polyol a combination comprising:
   (1) from about 0.025 equivalent to about 0.15 equivalent, per equivalent of polyisocyanate, of an ethylene oxide capped polypropyleneoxy glycol having an equivalent weight of from about 750 to about 1500; and
   (2) from about 0.05 equivalent to about 0.25 equivalent, per equivalent of polyisocyanate, of a diol selected from the group consisting of 1,4-butanediol and diethylene glycol.

2. A polymer according to claim 1 wherein said diol (2) is 1,4-butanediol.

3. A polymer according to claim 1 wherein said diol (2) is diethylene glycol.

4. A polymer according to claim 1 wherein said organic polyisocyanate is a polymethylene polyphenylisocyanate mixture comprising from about 30 percent to about 80 percent by weight of methylenebis(phenylisocyanate), the remainder of said mixture being polymethylene polyphenylisocyanates of functionality higher than 2.

5. A polymer according to claim 1, 2, 3 or 4 wherein said glycol (1) is present in the proportions of from about 0.05 to about 0.10 equivalent, per equivalent of polyisocyanate.

6. A polymer according to claim 1, 2, 3, or 4 wherein said diol (2) is present in the proportions of from about 0.10 to about 0.20 equivalent, per equivalent of polyisocyanate.

7. A solid polymer in which the major recurring polymer unit is isocyanurate which polymer comprises the reaction product obtained by bringing together:
   (A) a polymethylene polyphenylisocyanate mixture comprising from about 30 percent to about 80 percent by weight of methylenebis(phenylisocyanate) and the remainder of said mixture being polymethylene polyphenylisocyanates of functionality higher than 2;
   (B) a trimerization catalyst; and
   (C) a polyol combination comprising:
      (1) from about 0.05 to about 0.10 equivalent, per equivalent of said polyphenylisocyanate, of an ethylene oxide capped polypropyleneoxy glycol having an equivalent weight of from about 800 to about 1000; and
      (2) from about 0.10 to about 0.20 equivalent, per equivalent of said polyphenylisocyanate, of a diol selected from the group consisting of 1,4-butanediol and diethylene glycol.

8. A polymer according to claim 7 wherein said diol (2) is 1,4-butanediol.

9. A polymer according to claim 7 wherein said diol (2) is diethylene glycol.

10. A solid polymer in which the major recurring polymer unit is isocyanurate which polymer comprises the reaction product obtained by bringing together:
    (A) a polymethylene polyphenylisocyanate mixture comprising about 65 percent by weight of methylenebis(phenylisocyanate) and the remaining 35 percent of said mixture being polymethylene polyphenylisocyanates of functionality higher than 2;
    (B) about 1.1 parts by weight per equivalent of said polyphenylisocyanate of a catalyst blend comprising in the proportions by weight:
       (i) about 3.6 parts of N,N',N''-tris(dimethylaminopropyl)hexahydrotriazine, and
       (ii) about 1 part of a 67 percent by weight solution of potassium 2-ethylhexanoate dissolved in about a 400 molecular weight polypropylene glycol; and
    (C) a polyol combination comprising:
       (1) about 0.05 equivalent, per equivalent of said polyphenylisocyanate, of an ethylene oxide capped polypropyleneoxy glycol having an equivalent weight of about 1000; and
       (2) about 0.10 equivalent, per equivalent of said polyphenylisocyanate, of a diol selected from the group consisting of 1,4-butanediol and diethylene glycol.

11. A polymer according to claim 10 wherein said diol (2) is 1,4-butanediol.

12. A polymer according to claim 10 wherein said diol (2) is diethylene glycol.